Aug. 15, 1950 S. B. WINN 2,519,091
AUTOMATIC TRAILER PROP
Filed Sept. 8, 1947 3 Sheets-Sheet 2
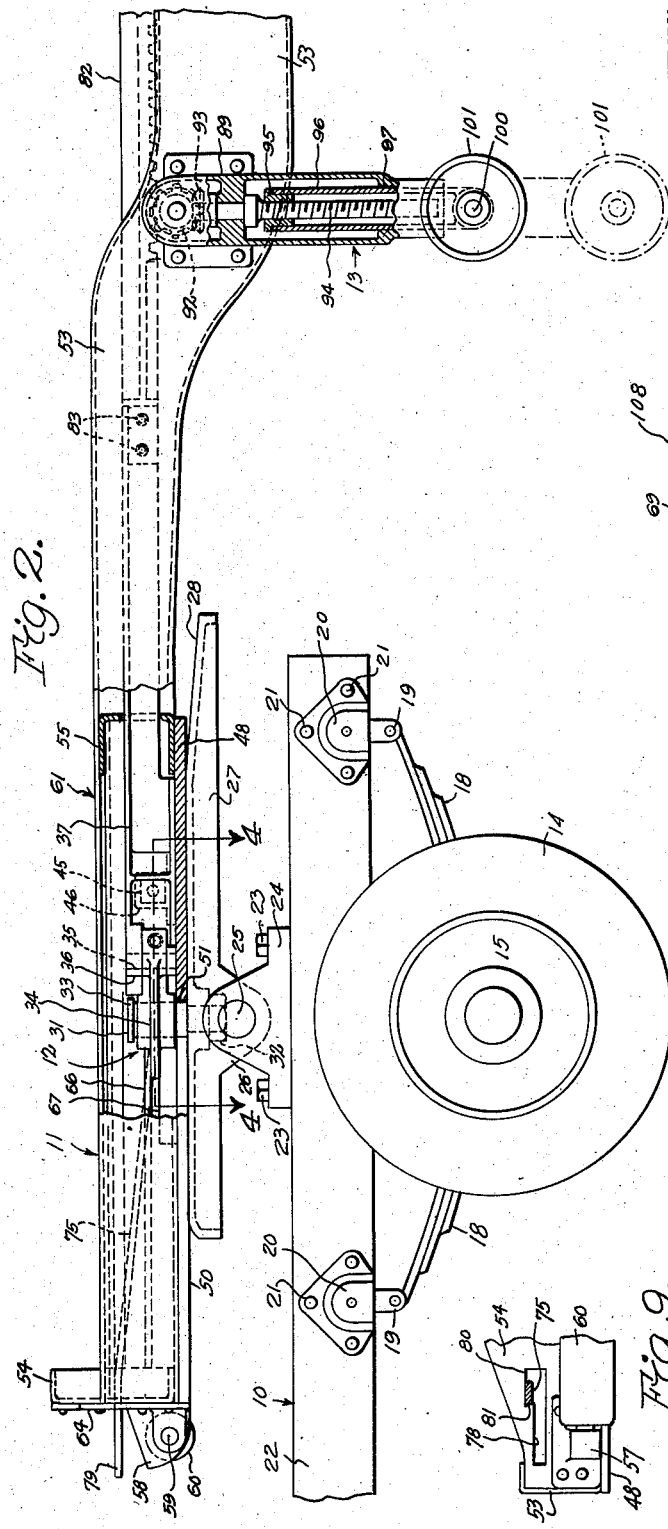
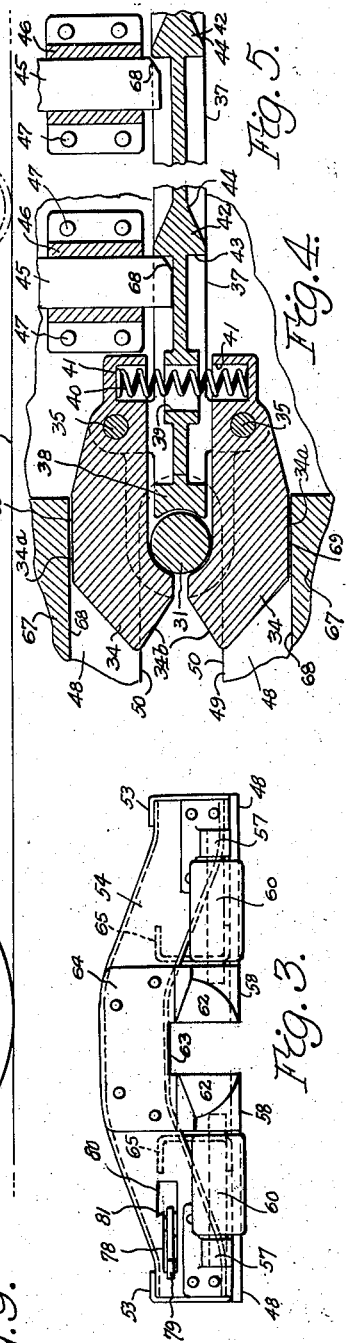
Inventor
Sidney B. Winn
Barthel & Bugbee
Attorneys

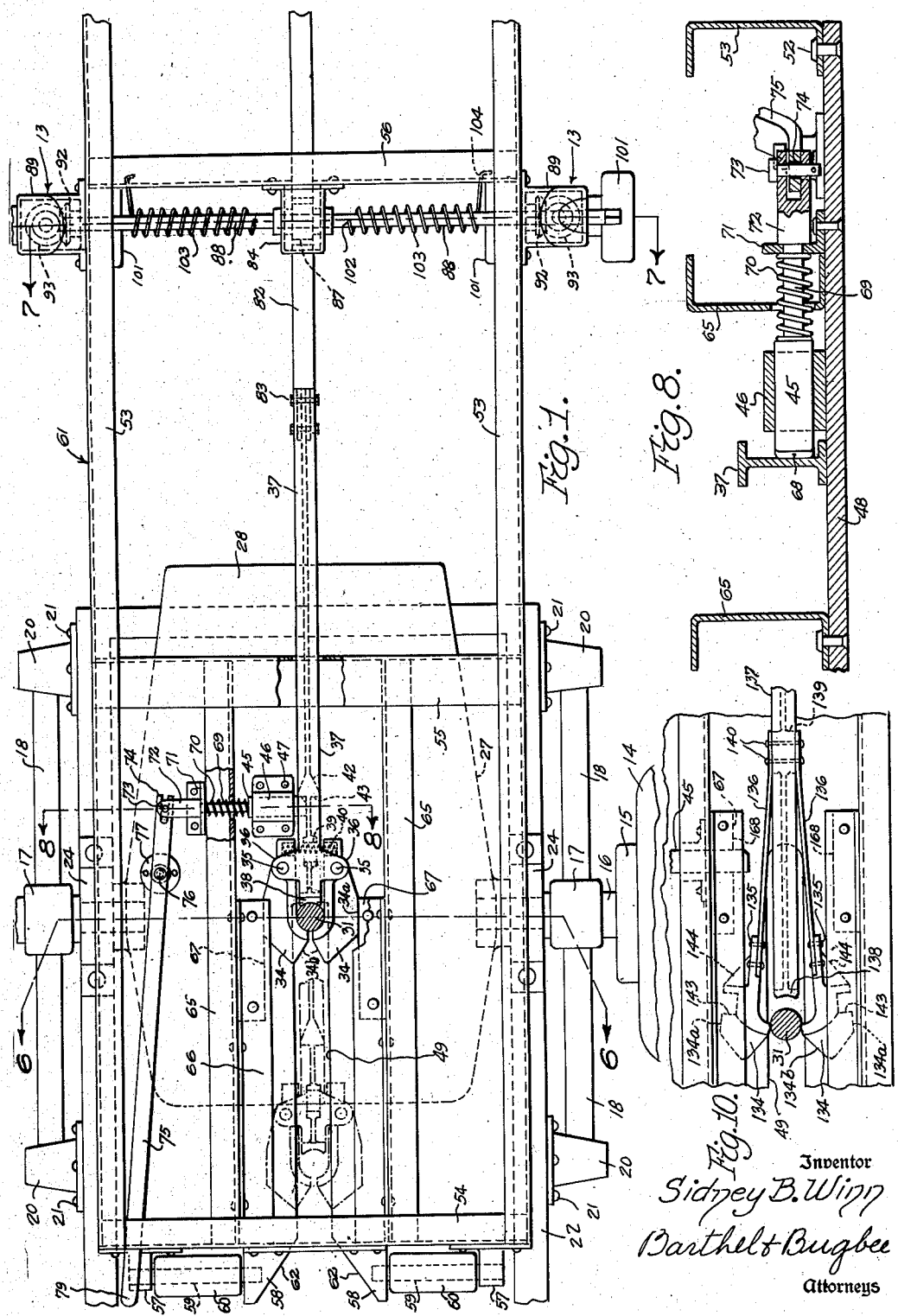

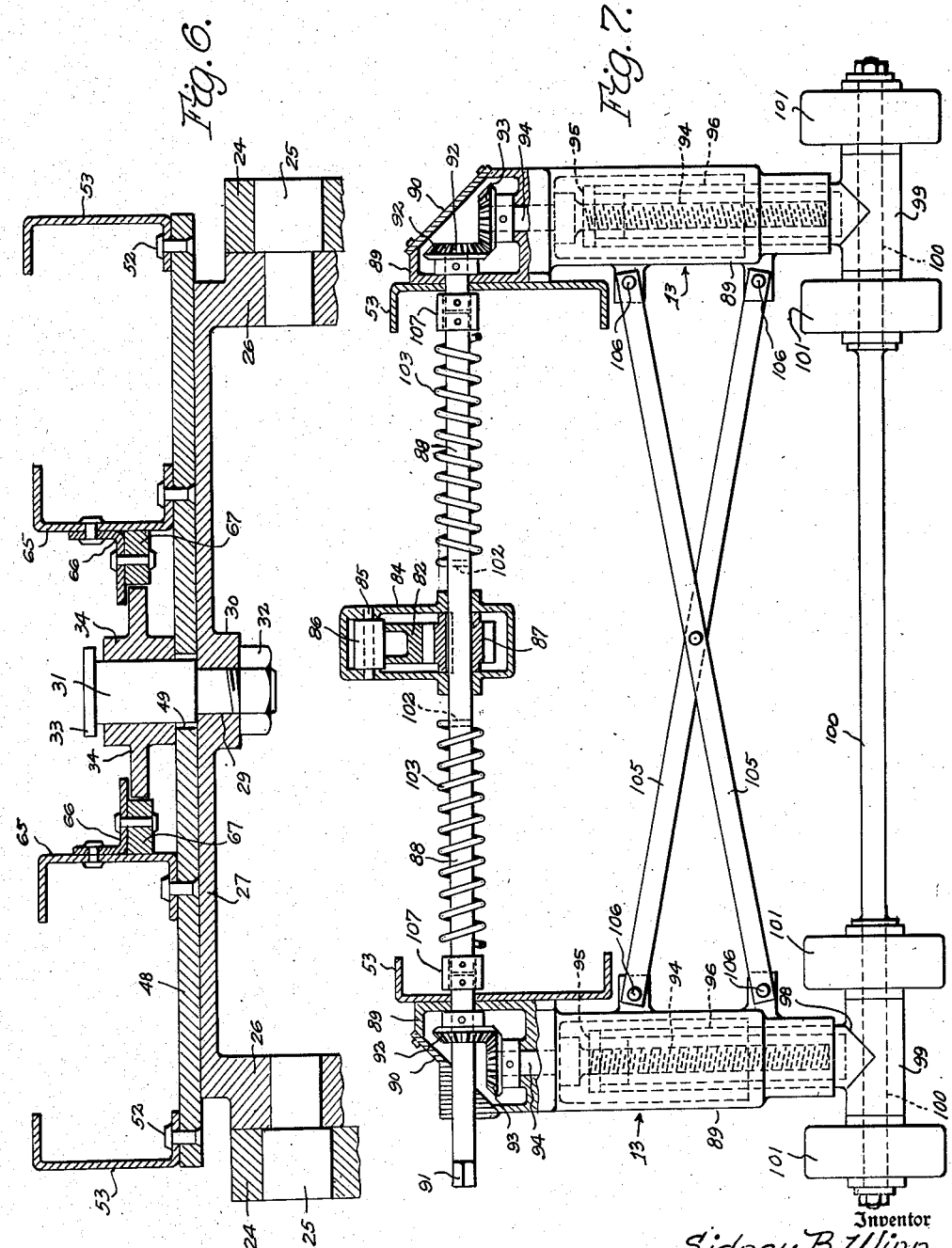

Patented Aug. 15, 1950

2,519,091

UNITED STATES PATENT OFFICE 2,519,091

AUTOMATIC TRAILER PROP

Sidney B. Winn, Lapeer, Mich.

Application September 8, 1947, Serial No. 772,707

10 Claims. (Cl. 280—33.05)

This invention relates to tractor-trailer vehicles and, in particular, to landing gears or props for trailer vehicles.

One object of this invention is to provide a trailer landing gear or prop which is automatically retracted in response to the coupling of the trailer with the tractor, and automatically protracted in response to the uncoupling of the tractor from the trailer.

Another object is to provide a trailer landing gear or prop which is connected by mechanism to the tractor-trailer coupling device in such a manner that as the kingpin pulls away from the coupling position to uncouple the vehicles, the previously-mentioned mechanism operates automatically to lower the prop or landing gear.

Another object is to provide an automatically-operated landing gear for tractor-trailer vehicles, as set forth in the preceding objects, wherein additional resilient means, such as a spring, is provided to automatically lower the prop or landing gear in response to the uncoupling of the vehicles in the event that the kingpin-operated mechanism fails either wholly or partially to do so.

Another object is to provide an automatically-operated landing gear or prop for tractor-trailer vehicles, as set forth in the preceding objects, wherein a locking bolt is provided for locking the prop-operating mechanism in the coupled position of the vehicles, this being manually unlocked but automatically advanced into position for again locking the vehicles after they have been uncoupled.

In the drawings:

Figure 1 is a top plan view, partly in horizontal section, of the fifth wheel and adjacent coupled portions of a tractor-trailer combination with the parts in their coupled positions and the prop or landing gear raised;

Figure 2 is a side elevation, partly in section, of the portions of the vehicles shown in Figure 1, with the parts thereof in the same positions;

Figure 3 is a left-hand end elevation of the front end of the trailer vehicle shown in Figures 1 and 2;

Figure 4 is a horizontal section through the coupling jaws, locking bolt and adjacent mechanism taken along the line 4—4 in Figure 2;

Figure 5 is a fragmentary horizontal section similar to the right-hand end of Figure 4, but with the locking bolt in its unlocked position;

Figure 6 is a vertical cross-section taken along the line 6—6 in Figure 1 showing the king pin and coupling jaws;

Figure 7 is a vertical section taken along the line 7—7 in Figure 1 showing the prop raising and lowering mechanism;

Figure 8 is a vertical cross-section taken along the line 8—8 in Figure 1, showing the locking bolt and its associated mechanism;

Figure 9 is a fragmentary end elevation similar to the left-hand end of Figure 3, but with the locking bolt in its unlocked position and its operating lever seated in its holding notch; and Figure 10 is a fragmentary top plan view of the central portion of Figure 1, showing a modified spring mounting for the coupling jaws.

Hitherto in tractor-trailer vehicles it has been necessary for the driver or operator to lower the prop or landing gear of the trailer before he uncoupled the trailer from the tractor. In the event that he forgot to do this, the uncoupling operation caused the forward end of the trailer to drop to the ground, with frequent damage to the trailer and its contents by reason of the shock resulting from such a drop as well as the shifting of the contents of the trailer.

The present invention solves this problem by rendering it impossible for the operator to neglect to lower the prop or landing gear before he uncouples the trailer from the tractor. It does this by providing mechanism which automaticaly lowers the prop or landing gear in response to the uncoupling of the vehicles.

Referring to the drawings in detail, Figures 1 and 2 show the rearward end of a tractor, generally designated 10, coupled to the forward end of a trailer, generally designated 11, through the action of a coupling device or fifth wheel, generally designated 12. The latter is operatively connected to the mechanism of automatically-lowered and raised props or landing gear, generaly designated 13.

The tractor 10 is of any conventional type and its details form no part of the present invention. The rearward end of the tractor 10 is supported by the tires 14 of wheels 15 mounted upon an axle (not shown) contained within an axle housing 16 which in turn is supported by hangers 17 (Figure 1) secured to the mid-portions of leaf springs 18. The springs 18 are supported at their opposite ends by spring shackles 19 (Figure 2) which are carried by spring brackets 20 secured as at 21 to the trailer frame side members 22.

Bolted as at 23 to the tops of the frame side members 22 are bearing or trunnion brackets 24 in which pivot shafts or trunnions 25 are pivotally mounted, these in turn being mounted in bracket portions 26 extending downward from a fifth wheel table or lower fifth wheel 27. By this means, the table 27 is rockably mounted on the tractor 10. The rearward end of the table 27 is inclined downward as at 28 to facilitate coupling and uncoupling.

Mounted in the bore 29 of a boss 30 (Figure 6) in the center of the table 27 is the lower end of a king pin or coupling pin 31, a nut 32 being threaded thereon to secure it in position. The king pin 31 is flanged at its upper end 33. Engageable with the opposite sides of the kingpin 31 are two oppositely-facing coupling jaws 34 which are pivotally mounted on vertical pins 35 (Figures 1 and 4) mounted in the ends of a cross member 36 which in turn is located near the forward end of a reciprocating operating bar 37. A kingpin contacting portion 38 extends forward from the cross member 36 and engages the kingpin 31 when the jaws 34 are closed upon the kingpin 31.

The operating bar 37 is in the form of an I-beam (Figure 8) and has a transverse hole 39 therein (Figure 4) through which passes a coil compression spring 40 having its opposite ends seated in the cupped portions 41 at the opposite ends of the coupling jaws 34 from the forward portions thereof which engage the kingpin 31. The operating bar 37 is also provided with a laterally-projecting stop 42 (Figure 4) which has a forwardly-facing abutment shoulder 43 and a rearwardly-facing inclined portion 44. Engageable with the abutment shoulder 37 is a locking bolt 45 which is slidably mounted in a bracket 46, the latter in turn being secured as at 47 to the fifth wheel plate or upper fifth wheel 48. The plate 48 is provided with a longitudinal slot 49 with opposite edges 50 for receiving the kingpin 31 (Figures 4 and 6). The slot 49 terminates at its rearward end in a shoulder 51 (Figure 2).

Secured as by the fasteners 52 to the plate 48 are the frame side members 53 (Figure 6) of the trailer 11, these being interconnected by cross members 54, 55 and 56 (Figure 1). Bolted or riveted to the cross member 54 are outer and inner brackets 57 and 58 respectively, which in turn support the roller shafts 59 upon which are rotatably mounted the rollers 60. The rollers 60 are so mounted in order to facilitate the engagement of the forward end of the trailer frame, generally designated 61, with the lower fifth wheel or table 27.

The inner faces 62 of the brackets 58 are inwardly toward the slot 63 in the braket plate 64 (Figure 3) which in turn is aligned with the adjacent edges 50 of the slot 49. Likewise, secured to the upper fifth wheel or plate 48 are the longitudinal channel members 65 and these in turn have longitudinal angle members 66 secured thereto (Figure 6). Secured to the angle members 66 are the guide bars 67, the inner edges of which engage the outer edge portions 34a (Figure 4) of the coupling jaws 34, preventing the latter from opening and thereby uncoupling the kingpin 31 throughout the length of the guide bars 67, which extend only part way toward the forward cross member 54 of the trailer frame 61. The forward ends of the coupling jaws 34 are also beveled as at 34b to facilitate spreading of the jaws 34 in response to the entry of the kingpin 31.

One of the forward corners of the locking bolt 45 is bevelled as at 68 (Figure 4) and its rearward end is provided with a rod 69 passing through a hole in one of the longitudinal channel members 65 (Figure 8) and is encircled by a coil spring 70. The coil spring 70 urges the bolt 45 into engagement with the operating bar 37 behind the abutment shoulder 43, and has its rearward end engaging an angle bracket 71 bolted or riveted to the plate 48. The rearward end of the rod 69 carries a clevis 72 with a pin 73 mounted therein and engaged by the slotted or forked end portion 74 of the actuaing lever 75. The latter is pivoted as at 76 to the bracket 77 which in turn is secured to the plate 48 (Figure 1). The forward end of the lever 75 passes through a horizontal slot 78 in the frame cross member 54 (Figures 3 and 9) and has a handle portion 79 projecting forwardly therefrom. The slot 78 is provided with a notch 80 having a bevelled locking shoulder 81 engageable with the correspondingly bevelled edge of the lever 75. Figure 3 shows the position of the lever 75 with the bolt 45 in its locked position prior to coupling whereas Figure 9 shows the lever 75 raised into the notch 80 so as to hold the bolt 45 in its unlocked position of Figure 5, ready for uncoupling the tractor 10 from the trailer 11.

The operating bar 37 extends rearwardly along the trailer frame 61 and has a rack bar 82 connected as at 83 to its rearward end. The rack bar 83 is slidably supported by a casing 84 (Figures 1 and 7) secured to the frame cross member 56 and carrying a pivot pin 85 upon which is mounted a roller 86 engageable with the upper edge of the rack bar 82. The teeth on the lower edge of the rack bar 82 engage the corresponding teeth on a pinion 87 keyed to a cross-shaft 88 which is journaled in the opposite sides of the casing 84 (Figure 7) and also in the upper ends of the prop or landing gear housings 89 secured to the frame side members 53. One end of the shaft 88 passes through one of the closure plates 90 of the housing 89 and is squared as at 91 for the attachment of a hand crank (not shown). Pinned or otherwise secured to the shaft 88 within the housings 89 are bevel pinions 92 which in turn mesh with bevel pinions 93 secured to the upper ends of screw shafts 94 journaled in the housings 89 and extending downwardly therein. Mounted upon the threaded lower portion of each screwshaft 94 is a nut mounted in the upper end of a tubular member 96, the lower end of which is slidably mounted in a vertical bore 97 in the lower end of the housing 89 and outside of the latter is connected as at 98 to an axle housing 99. The latter carries an axle 100 having wheels 101 mounted on its opopsite ends on opposite sides of the casing 84. The shaft 88 is provided with transverse holes 102 in which are seated the inner ends of a pair of coil springs 103, the outer ends of which are anchored as at 104 to the frame cross member 56 (Figures 1 and 7). The housings 89 are cross-braced by cross-members 105 secured thereto as at 106 (Figure 7). The central portion of the shaft 88 is loosely but drivingly connected to the end portions thereof by loose couplings 107 to prevent binding.

In the operation of the invention, let it be assumed that the parts are in the coupled positions shown in Figures 1, 2 and 4. Preparatory to uncoupling the vehicles, the operator swings the handle 79 of the lever 75 (Figure 3) inward and upward into the notch 80 against the bevel portion 81 (Figure 9) where it is held by the coil spring 69. This action withdraws the bolt 45 from the locked position shown in Figure 4 to the unlocked position shown in Figure 5, so that the bevelled portion 68 of the bolt 45 can easily slide over the corner edge between the portions 43 and 44 of the stop 42.

To uncouple the vehicles, the operator now drives the tractor 10 forward (to the left in Figures 1 and 2), carrying with it the kingpin 31. Since the coupling jaws 34 are held in their locked or coupling positions by the engagement of their side edges 34a with the corresponding edges 68 of the guide bars 67, the travel of the kingpin 31 to the left carries with it the coupling jaws 34 and with them the operating bar 37. Thus, these parts move from the solid line position to the dotted line position shown in Figure 1. As the coupling jaws 34 move beyond the edges 68 of the guide bars 67, they are held in the coupling position solely by the pressure of the coil spring 40. Thenceforth the jaws 34 are free to be forced apart by the pull of the kingpin 31 when either of the props 13 hits the ground or the jaws 34 reach the end of their travel or as explained below.

As the operating bar 37 and rack bar 82 are thus pulled forward by the kingpin 31 (in the coupling jaw 34), the rack bar 82 rotates the pinion 87, shaft 88, bevel pinions 92 and 93 (Figure 7) and screw shafts 94. The rotation of the screw shafts 94 causes the nuts 95 and tubular members 96 to move downward, carrying with them the axle housings 99, axles 100 and wheels 101. The wheels 101 move downward until they reach the limit of their descent which is normally slightly above the ground level 105, (Figure 2), or until they contact a hummock or other elevation above the ground level 108. Thus, the props 103 are automatically moved into their lowered positions as the uncoupling operation is carried out. At the same time, the rotation of the shaft 88 is enhanced by the force of the coil spring 103, which has been wound up automatically by the counter-rotation of the shaft 88 in raising the props 13 during the previous coupling operation.

As the abutment 43 on the operating rod 37 moves past the bevelled portion 68 of the bolt 45, this being temporarily held in its unlocked position (Figure 5) by the engagement of the hand lever 75 in the notch 80 (Figure 9), the stop 42 kicks the bolt 45 out. This action swings the hand lever 75 inward away from the bevelled shoulder 81 (Figure 9) so that it drops out of the notch 80 by gravity and swings outward in the slot 78. The action of the coil spring 69, while swinging the hand lever 75 outward in the slot 78, also moves the bolt 45 inward to the right of the stop 42 (Figure 4) which has now passed to the left of the bolt 45. The parts are now ready for re-coupling.

To re-couple the trailer 11 with the tractor 10, the operator backs the latter carefully toward the former so that the kingpin 31 enters the notch 63 (Figure 3) and slot 49 in the upper fifth wheel or plate 48. The kingpin 31 engages the bevelled end portions 34b of the coupling jaws 34, spreading them apart and coming to rest behind them in engagement with the kingpin contacting portion 38 (Figure 4). The coil spring 40 causes the jaws 34 to close around the kingpin 31, and the backing motion of the trailer 10 pushes the operating rod 37 rearwardly (to the right in Figures 1 and 2) from the dotted line position to the solid line position of Figure 1. As the edge portions 34a of the coupling jaws 34 enter the space between the guide bars 67, they become incapable of moving outward, hence are firmly locked in position. As the inclined portion 44 of the stop 42 moves past the end of the bolt 45, it shifts the latter sidewise, the spring 70 urging the bolt 45 forward again into the locking position shown in Figure 4 when the stop portion 42 has passed. Locking then takes place between the bolt 45 and the abutment shoulder 43.

Meanwhile, as the operating bar 37 has been forcibly moved rearward by the engagement of the kingpin 31 therewith, the consequent rearward motion of the rack bar 82, rotates the shaft 88 by means of the pinion 87 and winds up the coil spring 103, storing potential energy therein as it rotates the screwshafts 94 through the bevel pinions 92 and 93 to raise the wheels 101 of the props 13. As the kingpin 31 comes into engagement with the end wall 51 of the slot 49 (Figure 2), the props 13 reach their raised or solid line positions shown in Figure 2. The vehicles are now firmly coupled together and locked in their coupled positions, with the hand lever 75 in the position shown in Figures 1 and 2. The vehicles are now ready for travel.

The coil springs 103, by reason of their stored-up energy when coiled, assist in lowering the props 13 to their dotted line positions (Figure 2) and also insure smooth operation of the mechanism. Thus, the trailer 11 cannot be separated from the tractor 10 without dropping the props or landing gear 13, and the two vehicles cannot be coupled without raising the props 13. The screw and nut mechanism (Figure 2) for raising and lowering the props 13 is irreversible and hence self-locking in any position thereof. Thus the props 13 cannot be forced upward by contact with the ground, and require no separate locking devices such as the pawls and ratchets of prior prop mechanisms.

The modified coupling jaw mechanism shown in Figure 10 may be substituted for that shown in Figure 1, the parts into which it fits being similarly designated where they are the same, the reference numerals of the remaining parts being increased by 100. Engageable with the opposite sides of the kingpin 31 are two oppositely-facing coupling jaws 134 which are bolted or riveted as at 135 to flat springs 136 which, in turn, are bolted or riveted to a reciprocating operating bar 137, generally similar to the operating bar 37 and having a similar kingpin contacting portion 138.

The operating bar 137, like the operating bar 37, is in the form of an I-beam but lacks the pivot mounting 35, 36 and the transverse hole 39, the flat springs 136 replacing the coil spring 40. The operating bar 137 is provided with a boss or thickened portion 139 to which the ends of the flat springs 136 are secured, as at 140. The locking bolt 45 in the Figure 10 modification engages a correspondingly-shaped notch 143 in one of the jaws 134 (both being shown with such notches because the jaws 134 are interchangeable). The notch 143 replaces the abutment shoulder 43, and is formed in the edge 134a of the coupling jaw 134 which has entrance portions 134b. The rearward edges of the jaws 134 have bevelled or rearwardly-facing inclined portions 144 along which the end of the locking bolt 45 can slide before entering the notch 143. The guide bars 67 in the Figure 10 modification engage the outer edge portions 134a of the coupling jaws 134 in a similar manner to the action thereof in Figure 1, the inclined portions 144 also facilitating entry of the jaws 134 into the space between the opposed edges 68 of the guide bars 67. The flat or leaf springs 136 normally urge the coupling jaws 134 inward, but the latter may be pushed apart by the kingpin 31 after they have pased forward out of their temporary restraining arrangement with the guide bar edges 168, as shown in Figure 10. The kingpin 31 is then free to move forward independently, while the coil springs 103 assist in the further lowering of the props 13, if these have not already contacted the ground.

What I claim is:

1. An automatically-extensible trailer prop device for a tractor-trailer combination having mutually interlocking coupling members thereon, said prop device comprising a prop supporting structure with a vertical guideway mounted on said trailer, a prop structure vertically reciprocable in said guideway and movable between a raised travelling position and a lowered trailer-supporting position, intermeshing screw and nut mechanism operatively interconnecting said structures a rotary shaft drivingly connected to said mechanism for moving said prop structure from one position to the other, an elongated member reciprocably mounted on said trailer and operatively connected to one of said coupling members and reciprocable in response to the uncoupling motion of said coupling members, and a reciprocatory-to-rotary motion-converting power-transmitting device operatively interconnecting said shaft and said elongated member, said device being responsive to the reciprocation of said elongated member in one direction to rotate said shaft and actuate said screw-and-nut mechanism to move said prop structure in a prop-lowering direction.

2. An automatically-extensible trailer prop device for a tractor-trailer combination having mutually interlocking coupling members thereon, said prop device comprising a prop supporting structure with a vertical guideway mounted on said trailer, a prop structure vertically reciprocable in said guideway and movable between a raised travelling position and a lowered trailer-supporting position, intermeshing screw and nut mechanism operatively interconnecting said structures a rotary shaft drivingly connected to said mechanism for moving said prop structure from one position to the other, an elongated member reciprocably mounted on said trailer and operatively connected to one of said coupling members and reciprocable in response to the uncoupling motion of said coupling members, a reciprocatory-to-rotary motion-converting and power-transmitting device operatively interconnecting said shaft and said elongated member, said device being responsive to the reciprocation of said elongated member in one direction to rotate said shaft and actuate said screw-and-nut mechanism to move said prop structure in a prop-lowering direction, and in another direction to rotate said shaft oppositely in a prop-raising direction.

3. An automatically-extensible trailer prop device for a tractor-trailer combination having mutually interlocking coupling members thereon, said prop device comprising a prop supporting structure with a vertical guideway mounted on said trailer, a prop structure vertically reciprocable in said guideway and movable between a raised travelling position and a lowered trailer-supporting position, intermeshing screw and nut mechanism operatively interconnecting said structures a rotary shaft drivingly connected to said mechanism for moving said prop structure from one position to the other, an elongated member reciprocably mounted in said trailer and operatively connected to one of said coupling members and reciprocable in response to the uncoupling motion of said coupling members, a reciprocatory-to-rotary motion-converting power-transmitting device operatively interconnecting said shaft and said elongated member, said device being responsive to the reciprocation of said elongated member in one direction to rotate said shaft and actuate said screw-and-nut mechanism to move said prop structure in a prop-lowering direction, and a yielding energy-storing element connected to said shaft to urge said shaft to rotate in a prop-lowering direction.

4. An automatically-extensible trailer prop device for a tractor-trailer combination having mutually interlocking coupling members thereon, said prop device comprising a prop supporting structure with a vertical guideway mounted on said trailer, a prop structure vertically reciprocable in said guideway and movable between a raised travelling position and a lowered trailer-supporting position, intermeshing screw and nut mechanism operatively interconnecting said structures a rotary shaft drivingly connected to said mechanism for moving said prop structure from one position to the other, an elongated member reciprocably mounted on said trailer and operatively connected to one of said coupling members and reciprocable in response to the uncoupling motion of said coupling members, a rack connected to said elongated member, and gearing operatively connecting said rack to said shaft, said gearing being responsive to the reciprocation of said rack by said elongated member to rotate said shaft and actuate said screw-and-nut mechanism to move said prop structure in a prop-lowering direction.

5. An automatically-extensible trailer prop device for a tractor-trailer combination having mutually interlocking coupling members thereon, said prop device comprising a prop supporting struture with a vertical guideway mounted on said trailer, a prop structure vertically reciprocable in said guideway and movable between a raised travelling position and a lowered trailer-supporting position, intermeshing screw and nut mechanism operatively interconnecting said structures a rotary shaft drivingly connected to said mechanism for moving said prop structure from one position to the other, an elongated member reciprocably mounted on said trailer and operatively connected to one of said coupling members and reciprocable in response to the uncoupling motion of said coupling members, a rack connected to said elongated member, gearing operatively connecting said rack to said shaft, said gearing being responsive to the reciprocation of said rack by said elongated member to rotate said shaft and actuate said screw-and-nut mechanism to move said prop structure in a prop-lowering direction, and a yielding energy-storing element connected to said shaft to urge said shaft to rotate in a prop-lowering direction.

6. An automatically-extensible trailer prop device for a tractor-trailer combination having mutually interlocking coupling members thereon, said prop device comprising a prop supporting structure with a vertical guideway mounted on said trailer, a prop structure vertically reciprocable in said guideway and movable between a raised travelling position and a lowered trailer-supporting position, intermeshing screw and nut mechanism operatively interconnecting said structures a rotary shaft drivingly connected to said mechanism for moving said prop structure from one position to the other, an elongated member reciprocably mounted on said trailer and operatively connected to one of said coupling members and reciprocable in response to the uncoupling motion of said coupling members, a rack connected to said elongated member, gearing operatively connecting said rack to said shaft, said gearing being responsive to the reciprocation of said rack by said elongated member to rotate said shaft and actuate said screw-and-nut mechanism to move said prop structure in a prop-lowering direction, and a latching element engageable with one of said members to latch the same against motion while said coupling members are in their coupled position.

7. An automatically extensible trailer prop device for a tractor-trailer combination having mutually interlocking coupling members thereon, said prop device comprising a prop supporting structure with a vertical guideway mounted on said trailer, a prop structure vertically reciprocable in said guideway and movable between a raised travelling position and a lowered trailer-supporting position, mechanism operatively interconnecting said structures for moving said prop structure from one position to the other, and a prop-operating member operatively connected between said prop-moving mechanism and one of said coupling members, said operating members being responsive to the uncoupling motion of one of said coupling members for actuating said moving mechanism to lower said prop structure to its trailer-supporting position, said prop mechanism also including a screw element and a nut element threadedly engaging one another, one of said elements being operatively connected to said prop structure and the other element being operatively connected to said prop-operating member.

8. An automatically-extensible trailer prop device for a tractor-trailer combination having mutually interlocking coupling members thereon, said prop device comprising a prop supporting structure with a vertical guideway mounted on said trailer, a prop structure vertically reciprocable in said guideway and movable between a raised travelling position and a lowered trailer-supporting position, mechanism operatively interconnecting said structures including a rotary shaft for moving said prop structure from one position to the other, an elongated member operatively connected to one of said coupling members and reciprocable in response to the uncoupling motion of said coupling members, and power-transmitting devices operatively interconnecting said shaft and said elongated member, said devices being responsive to the reciprocation of said elongated member in one direction to rotate said shaft in a prop-lowering direction, said prop moving mechanism also including a screw element and a nut element theadedly engaging one another, one of said elements being operatively connected to said prop structure and the other element being operatively connected to said rotary shaft.

9. An automatically extensible trailer prop device for a tractor-trailer combination having mutually interlocking coupling members thereon, said prop device comprising a prop structure mounted on said trailer and movable between a raised travelling position and a lowered trailer-supporting position, mechanism for moving said prop structure from one position to the other, a prop-operating member movably mounted on said trailer and operatively connected between said prop-moving mechanism and one of said coupling members, said operating member being responsive to the uncoupling motion of one of said coupling members for actuating said mechanism to lower said prop structure to its trailer-supporting position, one of said coupling members being mounted on said tractor, another of said coupling members being mounted on and slidable longitudinally along said trailer and connected to said prop-operating member for travel bodily therewith from a rearward coupling position to a forward uncoupling position, said trailer-mounted coupling member extending forwardly from said prop-operating member and having a portion movable laterally from a closed coupling position in front of said tractor-mounted coupling member to an open uncoupling position displaced laterally therefrom, a lock mounted on said trailer and movable into and out of locking engagement with one of said trailer-mounted members in the rearward coupling position of said coupling member and a resilient element engaging and yieldingly urging said trailer-mounted coupling member into coupling engagement with said tractor-mounted coupling member, said resilient element being adapted to exert a predetermined force effective to hold said coupling members in coupled relationship during their travel along said trailer from said rearward coupling position toward said forward coupling position, said resilient element being yieldable to effect opening of said coupling members in response to the exertion of a force thereon by said tractor-mounted coupling member in excess of said predetermined force.

10. An automatically extensible trailer prop device for a tractor-trailer combination having mutually interlocking coupling members thereon, said prop device comprising a prop structure mounted on said trailer and movable between a raised travelling position and a lowered trailer-supporting position, mechanism for moving said prop structure from one position to the other, a prop-operating member movably mounted on said trailer and operatively connected between said prop-moving mechanism and one of said coupling members, said operating member being responsive to the uncoupling motion of one of said coupling members for actuating said mechanism to lower said prop structure to its trailer-supporting position, one of said coupling members being mounted on said tractor, another of said coupling members being mounted on and slidable longitudinally along said trailer and connected to said prop-operating member for travel bodily therewith from a rearward coupling position to a forward uncoupling position, said trailer-mounted coupling member extending forwardly from said prop-operating member and having a portion movable laterally from a closed coupling position in front of said tractor-mounted coupling member to an open uncoupling position displaced laterally therefrom, a lock mounted on said trailer and movable into and out of locking engagement with one of said trailer-mounted members in the rearward coupling position of said coupling member one of said coupling members comprising a king pin and the other coupling member comprising a coupling jaw movably mounted to move laterally into and out of coupling engagement with said kingpin, and a resilient element engaging and yieldingly urging said coupling jaw into coupling engagement with said king pin, said resilient element being adapted to exert a predetermined force effective to hold said coupling jaw in coupled relationship with said kingpin during their travel along said trailer from said rearward coupling position toward said forward uncoupling position, said resilient element being yieldable to effect opening of said jaw in response to the exertion of a force thereon by said kingpin in excess of said predetermined force.

SIDNEY B. WINN.

REFERENCES CITED

The following references are of record in the file of this patent:

UNITED STATES PATENTS

| Number | Name | Date |
|---|---|---|
| 1,400,752 | Land | Dec. 20, 1921 |
| 1,838,868 | Reid | Dec. 29, 1931 |
| 2,080,342 | Seyferth | May 11, 1937 |
| 2,089,493 | Land | Aug. 10, 1937 |
| 2,135,205 | Wilson | Nov. 1, 1938 |
| 2,277,179 | Winn | Mar. 24, 1942 |
| 2,346,888 | Winn | Apr. 18, 1944 |